United States Patent [19]
Gröppel et al.

[11] 3,944,434
[45] Mar. 16, 1976

[54] HYBRID ELECTRODE FOR METAL/AIR CELLS

[75] Inventors: Dieter Gröppel; Gisela Siemsen, both of Erlangen, Germany

[73] Assignee: Siemens Aktiengesellschaft, Munich, Germany

[22] Filed: Jan. 30, 1975

[21] Appl. No.: 545,403

[30] Foreign Application Priority Data
Jan. 30, 1974 Germany............................ 2404444
Nov. 22, 1974 Germany............................ 2455431

[52] U.S. Cl......... 136/86 A; 136/86 D; 136/120 FC
[51] Int. Cl.²......................................... H01M 4/00
[58] Field of Search........... 136/86 D, 120 FC, 86 A

[56] References Cited
UNITED STATES PATENTS

| | | | |
|---|---|---|---|
| 3,480,538 | 11/1969 | Sturm | 136/120 FC |
| 3,527,616 | 9/1970 | Landi | 136/120 FC |
| 3,770,509 | 11/1973 | Winsel | 136/120 FC |

Primary Examiner—John H. Mack
Assistant Examiner—H. A. Feeley
Attorney, Agent, or Firm—Kenyon & Kenyon Reilly Carr & Chapin

[57] ABSTRACT

A hybrid electrode for metal/air cells of the type having a hydrophilic layer of nickel on the electrolyte side for the precipitation of oxygen, hydrophobic layer of plastic on the gas side and a hydrophobic layer of carbon between these two layers which contains an embedded metallic structure for use in dissolving oxygen, in which the metallic structure of the carbon layer is firmly connected to the nickel layer and protrudes on at least partially on the gas side beyond the carbon layer and into the plastic layer, the plastic layer also having a metallic structure embedded therein which is firmly connected to the part of the metallic structure protruding from the carbon layer.

18 Claims, 8 Drawing Figures

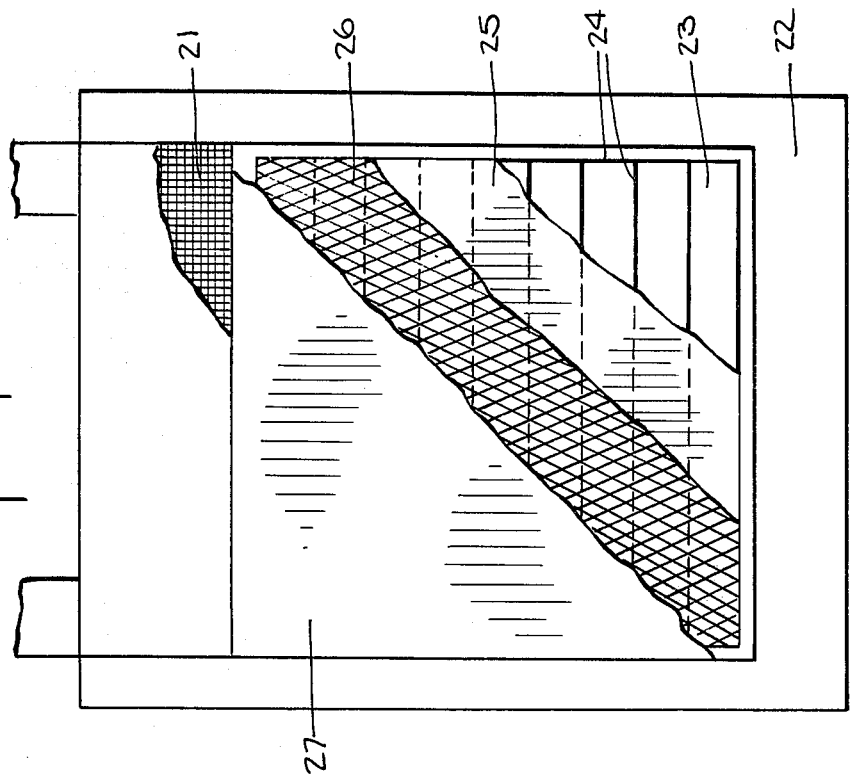
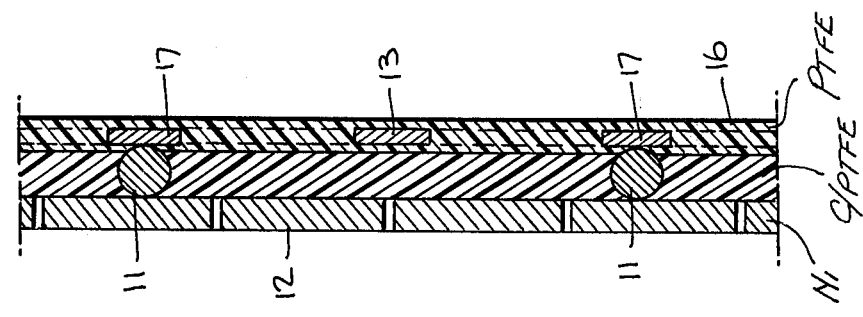
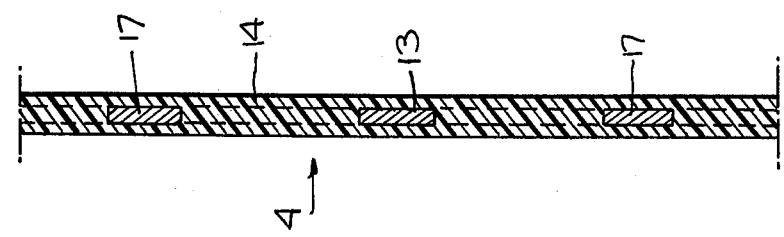
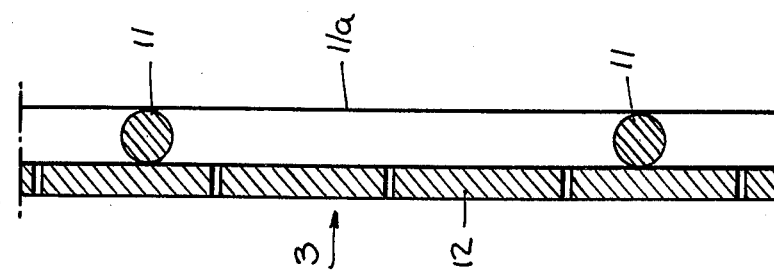

HYBRID ELECTRODE FOR METAL/AIR CELLS

BACKGROUND OF THE INVENTION

This invention relates to metal/air cells in general and more particularly to an improved hybrid electrode for use in such cells. Hybrid electrodes are known and are disclosed for example in German Offenlegungsschrift 1,921,157. A characteristic of this type of electrode is that it contains in one electrode a catalyst for gas separation or precipitation along with a catalyst for gas dissolution, with the catalysts arranged in two separate layers. In such a hybrid electrode a hydrophilic layer on the electrolyte side contains the catalyst for gas separation and a hydrophobic layer on the gas side contains the catalyst for gas dissolution. Nickel or graphite can be used as the catalysts for gas separation. Catalysts for gas dissolution may be carbon, silver, silver-impregnated carbon along with combinations of carbon with nickel oxide and cobalt oxide, carbon with cobalt oxide and aluminum oxide or carbon with magnesium oxide.

The significant advantage of a hybrid electrode is that only the catalysts used for the gas separation and the frame material that may be present need be corrosion-resistant at the potential of the gas separation. This results from the concept that the hydrophilic layer on the electrolyte side allows the flow lines to penetrate only negligibly into the hydrophobic layer on the gas side so that particles of the layer on the gas side which have contact with the metal electrode through the electrolytic liquid are at the normal at rest potential even during gas separation and are thus protected against corrosion. As a result the range of frame and catalyst materials which can be used on the gas side is substantially increased.

Hybrid electrodes for the dissolution and separation of oxygen for metal/air cells and which consist of a hydrophilic nickel layer on the electrolyte side used for $O_2$ separation, a hydrophobic carbon layer for the $O_2$ dissolution and a hydrophobic plastic layer on the gas side which prevents the electrolyte from escaping are known and are disclosed in Siemens Forschungsund Entwicklungsberichte, vol. 1, No. 2/72, page 221 to 226. In an arrangement such as this a metal screen for taking off current can be embedded in the hydrophobic carbon layer.

Electrodes of this nature have been found to be advantageous in comparison with other known electrodes. However with a cyclic load of 6 hours of $O_2$ separation and then 6 hours of $O_2$ dissolution at a current density of 30 mA/cm$^2$ and a potential of —200 to —300 mV with respect to an Hg/HgO/6 m KOH reference electrode, they have a life of only 50 to 60 cycles. The limited life of these electrodes results almost exclusively from the lack of mechanical cohesion between the individual layers. Plastic contained within the carbon layer to make this layer hydrophobic is also supposed to take care of the mechanical stability of this layer and bring about adhesion of the individual layers to each other. However it has been found that even with high percentages of plastic, such as plastic in the range of 40% by weight, the adhesion of the carbon layer to the nickel layer and the adhesion of the plastic layer to the carbon layer along with the mechanical stability of the carbon layer itself cannot be assured over extended periods of time. The mechanical stresses result particularly from the oxygen which is developed in the charging process at the boundary between the nickel and carbon layer and which results in the carbon layer being blown off from the nickel layer. Mechanical stresses also occur at the boundary between the carbon layer and the plastic layer probably because of the pressure exerted by the electrolytic liquid.

In view of these difficiencies, the need for an improved hybrid electrode which has increased mechanical supports so that its useful life can be extended becomes evident.

SUMMARY OF THE INVENTION

The present invention solves this problem by providing that the metallic structure embedded in the carbon layer is firmly connected to the nickel layer on the electrolyte side and that this metallic structure protrudes at least partially on the gas side beyond the carbon layer into the plastic layer. A metallic structure is also embedded in the plastic layer and this metallic structure firmly connected with the protruding portion of the metallic structure embedded in the carbon layer.

In a hybrid electrode of the present invention, the individual layers are connected with each other in a mechanically rigid fashion making separation of the layers impossible. This stable design leads to a substantially longer operating life as compared to electrodes previously used. The mechanical bond is accomplished by metallic bridges which extend from the nickel layer to the plastic layer. Through this firm connection the carbon layer is at the same time secured in place so that the plastic in the carbon layer need no longer function as a binder to hold the individual parts together but needs only serve to make the carbon layer hydrophobic. As a result the percentage of plastic in the carbon layer can be considerably reduced and the carbon percentage substantially increased so that the electrode can be more highly loaded.

In accordance with the present invention the metallic structure in the carbon layer will advantageously consist of individual wires, preferably nickel wires which are connected with the nickel layer on the electrolyte side at certain points. It is preferred that the wires are arranged in parallel ascending fashion to form that will hereinafter be referred to as a rung wall. That is to say the arrangement will have the appearance of a ladder with a plurality of wires forming the rung. Additional wires at the end of the wires correspond to the upright members in a ladder. The metallic structure in the plastic layer is advantageously expanded metal also preferably of nickel with the expanded metal connected to a plurality of points to a portion of the metallic structure of the carbon layer, i.e. the portion which protrudes into the plastic layer. It has been found that electrodes having this type of construction demonstrates the longest life.

However, the metallic structure in the carbon and plastic layer may also be metal screen. The metallic structure, consisting of nickel, in the carbon layer can also be designed such that a mesh or grid structure is impressed into one surface of the nickel layer used on the electrolyte side by stamping for example. In such a case the cavities will take up the carbon material. The metallic structure of the carbon layer may also be expanded metal, where, for example, in addition two expanded metal sheets with other than square meshes can be connected to the nickel layer, displaced 90° relative to each other.

Plastic material is employed to make the carbon layer hydrophobic. Preferably the plastic content of the carbon layer will be 20% by weight. Polytetrafluoroethylene (PTFE) is advantageously used as the plastic in the carbon layer and in the plastic layer. Additional plastic materials which may be considered are, for example, polytrifluoroethylene and polytrifluorochloroethylene. In this connection it is of advantage to provide the metallic structure in the plastic layer, e.g., the expanded metal with a coating of the plastic used in all places except where it is to be connected to the metallic structure of the carbon layer. This plastic coating will assure good connection with the remaining plastic of this layer and thus good adhesion of the plastic to the embedded metal structure.

The electrode of the present invention can be efficiently manufactured in the following manner. A metal structure is first joined to a nickel layer by spot-welding. A mixture of carbon and a hydrophobic plastic is then placed into this metal structure. Pressure is applied and the surface of the metal structure facing away from the nickel layer is exposed, i.e. adhering carbon and plastic material is removed. In this manner a carbon layer adhering to a nickel layer is produced with a metal structure partially protruding from the carbon layer. A second metal structure is enclosed with a hydrophobic plastic such that isolated metallic zones remain free of plastic. The isolated metallic zones of this second metal structure are then joined to the free surface of the first metallic structure by spot-welding. A hydrophobic plastic is subsequently placed on the second metal structure such that the metal structure is completely embedded in a plastic layer which extends up to the carbon layer. To obtain firm adhesion of the plastic a sintering operation is then performed.

BRIEF DESCRIPTION OF THE DRAWINGS

FIG. 1 illustrates the attachment of a first metallic structure to a nickel layer to form a first component of the electrode of the present invention.

FIG. 2 illustrates the formation of the second component of the electrode of the present invention.

FIG. 3 illustrates the electrode of the present invention with the two components put together and the layers filled in.

FIG. 4 is a schematic illustration of the layer construction of a hybrid electrode according to the present invention.

DETAILED DESCRIPTION OF THE PREFERRED EMBODIMENT

Figure 5:
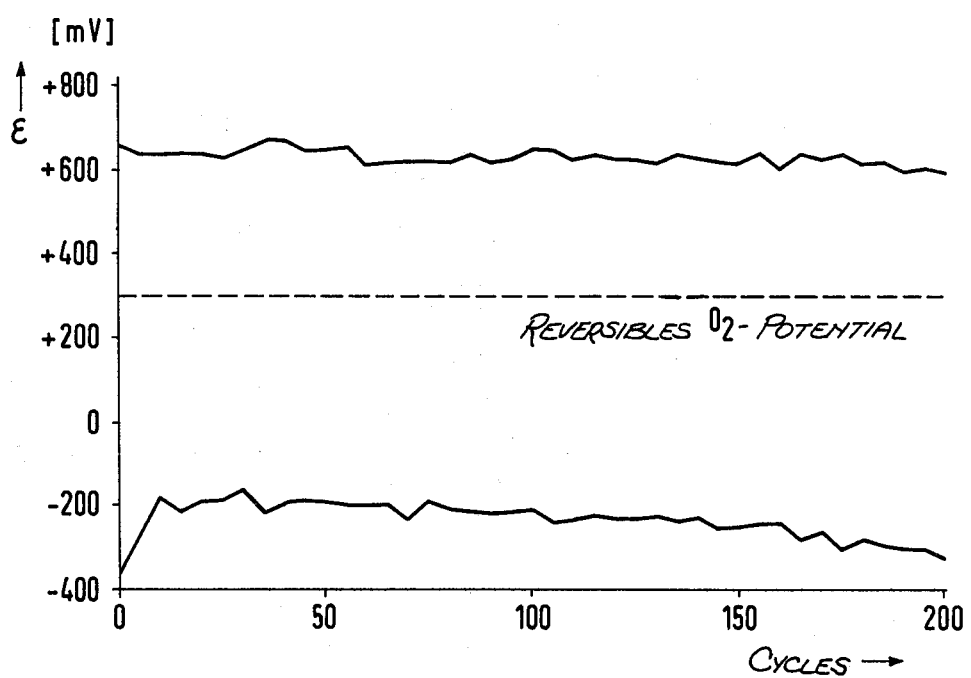
FIG. 5 is a graph illustrating the potential vs time behavior of a hybrid electrode according to the present invention.

FIGS. 1–3 illustrate a first embodiment of the present invention. FIGS. 1 and 2 illustrate two components which go together to make up the electrode shown in FIG. 3. The component 3 shown on FIG. 1 comprises a nickel cover layer 12 and the metallic structure for the carbon layer made up of a plurality of wires 11 arranged in a manner to be described below. The second component 4 shown in FIG. 2 comprises the metallic structure for the plastic layer with is partially coated with plastic. To fabricate the component 3, ten nickel wires 11 with a diameter of about 0.5 mm are spot-welded onto one side of a nickel plate 12 of about 10 cm by 10 cm and about 0.25 mm thick. They are arranged parallel to one edge of the nickel plate with a mutual spacing of about 1 cm. Perpendicular thereto along each edge an additional nickel wire 11a adjoing the ends of all nickel wires 11 is spot-welded to form an arrangement in the form of a wall of rungs much like a ladder. In this manner nine fields bounded by nickel wires each having an area of about 1 cm × 9 cm and a depth of about 0.5 mm [corresponding to the wire thickness] are created. Into these fields or depressions in the component 3 a mixture 15, shown on FIG. 3 containing carbon and PTFE is placed forming the hydrophobic carbon layer. Pressure is then applied and subsequently the adhering carbon/PTFE mixture is removed from the upper edges of the nickel wires 11, and 11a so that the nickel wires partially protrude from the carbon layer 15.

The nickel layer will preferably have porosity of about 50% and the pore diameter is generally a maximum of 5 to 7 $\mu$m. Soot coke with a grain size of approximately 60 $\mu$m can be used as the carbon material. Preferably it will be graphitized at 2400°C and activated with ammonia at about 850°C for 3 hours. An increase of the activation of the hybrid electrode can be obtained by coating the carbon with silver or other active components. For fabricating an electrode of 100 $cm^2$, a mixture of about 3 g of carbon, 0.8 g PTFE and 0.2 g of filler e.g. $Na_2SO_4$ all in powder form is preferably placed on the nickel layer which is firmly connected to the nickel wires and then pressure of about 1000 $N/cm^2$ applied.

To fabricate the component 4 of FIG. 2 a piece of expanded metal 13 is partially coated with PTFE 14. Nickel will preferably be used as the expanded metal 13. It will be rolled flat and of a size 10 cm × 10 cm with a thickness of 0.2 mm with a web thickness in the expanded material of 0.4 mm with a mesh width of 3 mm × 6 mm. This piece 13 is clamped in a template and the two surfaces of the expanded metal then partially covered in such a manner that, during a subsequent spraying with a PTFE, suspension areas 17 of about 1 mm wide of bare metal will remain between areas of PTFE coated expanded metal 14 with each of this areas about 9 mm wide. PTFE can be applied in the form of a suspension in a mixture of 3 parts by weight of n-propanol and 1 part by weight of isoamyl alcohol using a spray gun. Thereafter the PTFE is presintered at about 380°C for about 15 minutes. The component 3 containing the carbon/PTFE/filler mixture and the component 4 are subsequently placed on top of each other as shown on FIG. 3 so that the areas 17 which are free of PTFE come to lie on the carbon-free surfaces of the nickel wires. The metallic areas of the two components are then rigidly connected with each other by spot-welding. The structural unit thus produced is subsequently compressed so that the PTFE coated web of expanded metal lies firmly against the carbon layer. Finally the plastic layer 16 is formed and completed by placing PTFE in the meshes of the expanded metal and onto the expanded metal.

The hydrophobic PTFE-layer is made by sedimentation of PTFE powder [5g] suspended in a mixture [200 ml] consisting of equal parts of isopropanol and acetic acid ethylester. This is put onto the exposed carbon and PTFE coated expanded metal. The suspension medium is suctioned off after about 30 minutes through the carbon and nickel layers. This is followed by drying in a drying cabinet at about 100°C for about 15 minutes and then sintering in nitrogen at about 380°C for about 45 minutes causing the sedimented PTFE to be bounded with the presintered PTFE 14 at the expanded metal to form a uniform plastic layer 16. In the finished electrode shown on FIG. 3 the expanded metal 13 is then completely embedded in the plastic layer 16 and the nickel wires protrude at the points of connection with the areas 17 of the expanded metal 13 from the carbon layer 15 into the plastic layer 16.

By means of the purely metallic bridges (Ni cover layer, Ni wires of the carbon layer, metal webs of the expanded metal of nickel arranged in the PTFE containing layer), the nickel layer 12 and the plastic layer 16 are rigidly connected with each other mechanically. The carbon layer 15 is, at the same time, secured. Because the carbon material is fixed in the electrode, the PTFE in this layer no longer needs to function as a binder but needs only function as a hydrophobic agent. The PTFE content can therefore be reduced from about 40% to 20%. This reduction has a positive effect on the conductivity of the working carbon layer. In general the plastic content of the carbon layer is between about 20% and 30% by weight, referred to the weight of this layer without the metallic structure.

An electrode made in this manner weighs about 25 g, with the following percentages for the various components: Nickel layer and nickel wires 12 g; carbon/PTFE/filler mixture 4 g; PTFE-coated expanded Ni metal 4 g; remaining PTFE in the plastic layer 5 g. Since, during operation of the electrode, the filler is dissolved by the electrolytic liquid, e.g. 6 m KOH, thereby increasing the porosity of the carbon layer, the content of plastic in the carbon layer is merely about 21% by weight.

The electrode fabricated in the described manner is provided with a nickel screen which is spot-welded to an edge of the nickel cover layer in order to provide an external contact. Subsequently, the electrode is cemented into an electrode frame of plastic such as polystyrene.

The layer construction of a hybrid electrode 20 according to the present invention is schematically shown in FIG. 4. The electrode itself, along with a contact screen 21, is arranged in a plastic frame 22. On the electrolyte side, i.e. on that side which when in operation is to be the electrolyte side, the electrode is bounded by a porous nickel layer 23 with which the contact screen 21 is connected. Firmly connected to the nickel layer 23 are wires 24 which form the metallic structure embedded in the carbon layer 25. The wires 24 are firmly connected at numerous points with a sheet of expanded metal 26, which forms the metallic structure of the plastic layer 27 bounding the electrode on the gas side, i.e. on that side which when in operation is to be the gas side. FIG. 5 illustrates the potential-versus-time behavior of a hybrid electrode made by the described method. On this curve the number of cycles is plotted along the abscissa and the potential $\epsilon$ in mV, measured with respect to an Hg/HgO reference electrode in 6 m KOH as the electrolytic liquid along the ordinate. The electrode was loaded alternately with a current density of 40 mA/cm$^2$ in a 6-hour rhythm (6 hours discharge and 6 hours charge). The cathodic potential (discharge potential) remains at about $-200$ mV up to about the 100th cycle after which it drops slowly until after the 200th cycle it reaches about $-320$ mV. The anodic potential (charging potential) is approximately constant at about +660 mV until about the 100th cycle after which it drops slowly to about +600 mV at the 200th cycle. It follows from this data that the hybrid electrode according to the invention is greatly improved over electrodes presently in use as far as its mechanical stability is concerned and accordingly has increased service life. Thus, it is therefore extremely well suited for use in metal/air cells and metal/air batteries.

The hybrid electrode according to the invention for metal/air cells can be further improved substantially through the use of a metallic structure in the carbon layer consisting of two expanded metal sheets, displaced 90° relative to each other and joined at certain points with each other and the nickel layer on the electrolyte side. These sheets will have other than square meshes, and individual wires are connected at certain points to the expanded metal sheets and the metallic structure of the plastic layer.

Through such a design of the metallic structure in the carbon layer greater quantities of active material can be accommodated in the electrode without jeopardizing its mechanical stability and without appreciably increasing the thickness of the electrode. The behavior of the hybrid electrodes and the load capacity for continuous operation are further improved in this manner.

Expanded metal generally has approximately diamond-shaped meshes. In the hybrid electrode according to the present invention, expanded metal with mesh width of between about 2.5 and 4 mm and a mesh length of between about 5 and 8 mm can be used. Preferably, the mesh width will be about 3 mm and the mesh length about 6 mm. Expanded metal with such mesh dimensions insures, in particular, that, on one hand, the carbon layer contains enough active material and that, on the other hand, the adhesion of the active material at the metallic structure of the carbon layer and the adhesion of the carbon layer to the nickel cover layer is sufficient for good mechanical stability. The mesh width and mesh length correspond essentially to the lengths of the diagonals of the diamond-shaped meshes of the expanded metal.

The wires of the metallic structure of the carbon layer may advantageously have a wire thickness of about between 0.4 and 0.7 mm, in particular about 0.5 mm. The wires will preferably consist, as will the expanded metal in the carbon layer and in the plastic layer, of nickel. The mechanical bond of the individual components of the hybrid electrode according to the present invention is accomplished exclusively through metallic bridges of nickel, which extend from the nickel cover layer on the electrolyte side to the plastic layer on the gas side.

Figure 6:
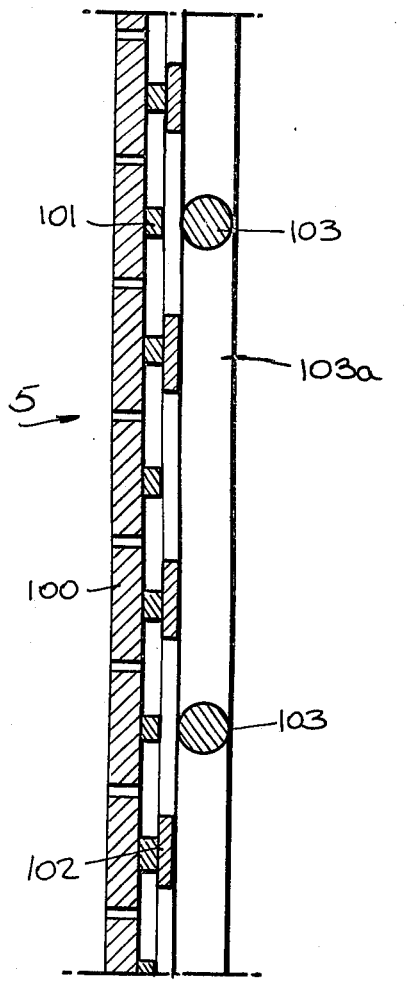
FIGS. 6–8 correspond to FIGS. 1–3 illustrating a further embodiment of the hybrid electrode of the present invention.
Figure 7:
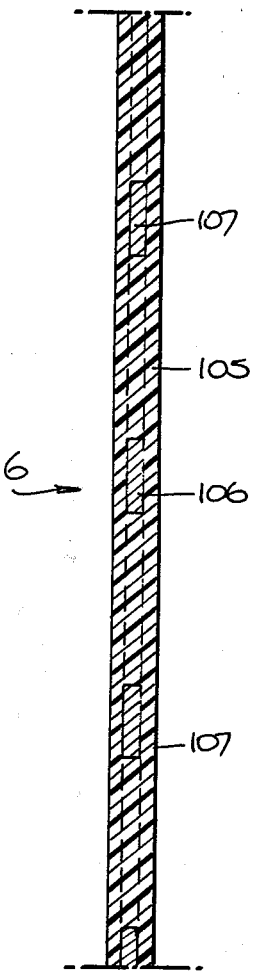
Figure 8:
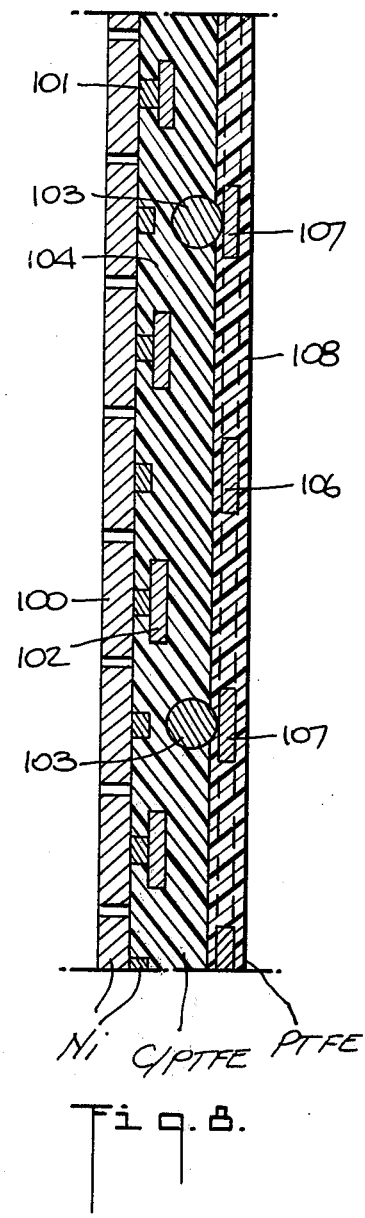

To manufacture the hybrid electrode shown in FIG. 8 essentially two components are used. The one component 5, shown in FIG. 6, consists of the nickel cover layer and the metallic structure for the carbon layer. The other component 6, shown in FIG. 7, which corresponds to the component 4 shown in FIG. 2 consists of a metallic structure, partially coated with plastic, for the plastic layer.

To fabricate the component 5, two expanded-metal nickel parts 101 and 102 each about 9.1 cm $\times$ 9.2 cm and displaced 90° with respect to each other, are attached by spot-welding on one side of a nickel plate with an area of about 10 cm $\times$ 10 cm and a thickness of about 0.4 mm. The mesh width of the expanded metal is about 3 mm, the mesh length about 6 mm. The width of the web about 0.4 mm and the thickness of the web about 0.1 mm. The arrangement of the expanded metal pieces displaced 90° with respect to each other leads to a design in which corresponding diagonals of the meshes lie at right angles to each other. Upon the metal structure comprising the nickel cover layer 100 and two expanded metal parts 101 and 102 ten nickel wires 103 with a diameter of about 0.5 mm are attached by spot welding with the wires parallel to one edge of the expanded metal parts and beginning at this edge. They are attached with a mutual spacing of about 1 cm. Along each edge a further nickel wire 103A is placed perpendicular to these nickel wires. Thus, a rung wall of the type described above in connection with FIGS. 1–3 is again obtained. The rung wall is connected point by point firmly with the expanded metal parts through the expanded metal parts with the nickel plate. In the component 5, the voids between the expanded metal and nickel wires are filled with a mixture containing essentially carbon and a hydrophobic plastic binder to form a hydrophobic layer 104 such as shown on FIG. 8. Pressure is then applied and the adhering mixture of carbon and plastic subsequently removed from the surface part of the nickel wires protruding above the layer 104 so that the nickel wires 103 partially protrude from the carbon layer 104.

To manufacture an electrode 100 cm² in size, a mixture of about 3.6 g of carbon, 1.8 g polytetrafluoroethylene (PTFE) and 0.6 g of filler (e.g., $Na_2SO_4$), each in powder form is placed in the voids formed by the nickel cover layer and the metallic structure of the expanded metal and nickel wires. The pressing operation is then performed at about 1000 N/cm². After pressing, the mixture adhearing to the nickel wires 103 is partially removed in the manner described above. In comparison to the embodiment of FIG. 3 in which 4 g of carbon/PTFE/filler mixture (3.0 g carbon, 0.8 g PTFE and 0.2 g filler) were used for preparing the carbon layer the weight with this embodiment is increased by 50%. As a result the carbon content itself increases comparatively by about 20%.

The fabrication of the component 6 shown on FIG. 7 and which comprises an expanded metal part 106 partially coated with PTFE 105 is essentially the same as the fabrication of the component 4 of FIG. 2. A piece of expanded metal made of nickel and about 10 cm × 10 cm rolled flat (web thickness 0.1 mm, web width 0.4 mm, mesh width 3 mm, mesh length 6 mm) is used. After the sintering operation, the expanded metal is cut to the dimensions corresponding to the expanded metal of the carbon layer.

The component 5 containing the carbon/PTFE/filler mixture and the component 6 are placed on top of each other in the manner shown in FIG. 8 so that the PTFE free areas 107 of the expanded metal part 106 come to lie on the carbon-free surfaces of the nickel wires 103. Metallic areas of the two components are then rigidly joined to each other by spot welding. The structural unit so produced is subsequently compressed to that the PTFE coated expanded metal webs lie firmly on the carbon layer. Preferably, this pressing takes place at a pressure of about 2000 N/cm². Pressing is advantageously repeated three times with the structural unit rotated 90° each time to insure uniform distribution of carbon in the metal structure and to equalize unevenness which might be present in the mold. Finally, the plastic layer 108 is completed by placing PTFE in the meshes of the expanded metal and on the expanded metal 106.

The hydrophobic PTFE layer 108 is filled in exactly the same manner as the plastic layer 16 in the embodiment of FIG. 3, using 8 g of PTFE powder. In the finished electrode the expanded metal 106 is completely embedded in the plastic layer 108. The nickel wires 103 of the metallic structure of the carbon layer protrude, at places where they are connected with the PTFE free areas 107 of the expanded metal 106, from the carbon layer 104 into the plastic layer 108.

The hybrid electrode fabricated in this manner is then provided with a nickel screen for making contact, the nickel screen being attached by spot-welding to an edge of the nickel cover layer. Then, as disclosed in connection with FIG. 4, the electrode is cemented into an electrode frame of plastics such as polystyrene.

To determine its behavior in extended operation, an electrode of this type was loaded in an alternating manner with an 1-hour rhythm (1 hour discharge and 1 hour charge) with a current density of about 50 mA/cm. A short load period was chosen since it has been found that the service life of a hybrid electrode is determined not by the length of cycles but by the number of cycles i.e. the number of alternating cathodic and anodic loadings. Under these trying conditions, the cathodic potential of the hybrid electrode of the present invention still remains at −300 mV after 300 cycles with measurements made with respect to an Hg/HgO/6 m KOH reference electrode.

Thus an improved hybrid electrode for use in metal air cells and a method of making such an electrode has been shown. Although specific embodiments have been illustrated and described, it will be obvious to those skilled in the art that various modifications may be made without departing from the spirit of the invention which is intended to be limited solely by the appended claims.

We claim:

1. A hybrid electrode for use in metal/air cells of the type having a hydrophilic layer of nickel on the electrolyte side for use in oxygen precipitation, a hydrophobic layer of plastic on the gas side and a hydrophobic layer of carbon between said two layers, the carbon layer containing an embedded metallic structure and being used for the dissolution of oxygen, wherein the improvement comprises:
   a. a metallic structure embedded in the carbon layer which is firmly connected on the electrolyte side to the nickel layer, with the metallic structure protruding at least partially on the gas side beyond the carbon layer and into the plastic layer; and
   b. a metallic structure embedded in the plastic layer, said metallic structure being firmly connected to the portion of the metallic structure embedded in the carbon layer which protrudes into the plastic layer.

2. A hybrid electrode according to claim 1 wherein the metallic structure in said carbon layer comprises a plurality of individual wires connected at a plurality of points with the nickel layer on the electrolyte side.

3. A hybrid electrode according to claim 1 wherein the metallic structure in said carbon layer comprises first and second expanded metal sheets having other than square meshes arranged displaced 90° relative to each other and connected at a plurality of points with each other and the nickel layer on the electrolyte side, and a plurality of individual wires connected at a plurality of points to the expanded metal sheets.

4. A hybrid electrode according to claim 1 wherein the metallic structure in said plastic layer is expanded metal, said expanded metal being connected at a plurality of points with the part of the metallic structure of the carbon layer which protrudes into the plastic layer.

5. A hybrid electrode according to claim 4 wherein said expanded metal is coated with a plastic coating at all places except in the regions of the points at which it is firmly connected to the metallic structure of the carbon layer.

6. A hybrid electrode according to claim 5 wherein said expanded metal has a mesh width between approximately 2.5 and 4 mm and a mesh length of between approximately 5 and 8 mm.

7. A hybrid electrode according to claim 3 wherein said expanded metal has a mesh width between approximately 2.5 and 4 mm and a mesh length between approximately 5 and 8 mm.

8. A hybrid electrode according to claim 2 wherein said wires have a diameter between approximately 0.4 and 0.7 mm.

9. A hybrid electrode according to claim 3 wherein said wires have a diameter between approximately 0.4 and 0.7 mm.

10. A hybrid electrode according to claim 2 wherein said wires are arranged in the form of a rung wall.

11. A hybrid electrode according to claim 3 wherein said wires are arranged in the form of a rung wall.

12. A hybrid electrode according to claim 1 wherein said metallic structures consist of nickel.

13. A hybrid electrode according to claim 1 wherein said carbon layer contains between approximately 20 and 30 per cent by weight of plastic.

14. A hybrid electrode according to claim 1 wherein said plastic is polyetetrafluoroethylene.

15. A hybrid electrode for use in metal/air cells of the type having ahydrophilic layer of nickel on the electrolyte side for use in oxygen precipitation, a hydrophobic layer of plastic on the gas side and a hydrophobic layer of carbon between said two layers, the carbon layer containing an embedded metallic structure and being used for the dissolution of oxygen wherein the improvement comprises:
   a. a metallic structure comprising at least a plurality of nickel wires arranged in the form of a rung wall embedded in a carbon layer consisting of carbon, a binder and approximately 20 to 30% by weight of plastic, said rung wall of wires being firmly connected on the electrolyte side to the nickel layer and protruding on the gas side at least partially beyond the carbon layer into the plastic layer; and
   b. a metallic structure comprising an expanded metal sheet of nickel embedded in the plastic layer, said expanded sheet of nickel being firmly connected with the portion of the wires of the rung wall protruding into the plastic layer with the plastic in said plastic layer and the plastic in said carbon layer being polytetrafluoroethylene.

16. A method for manufacturing a hybrid electrode for metal/air cells, said electrode being of the type having a hydrophilic layer of nickel on the electrolyte side for oxygen precipitation, a hydrophobic layer of plastic on the gas side and a hydrophobic layer of carbon between said two layers, said carbon layer containing an embedded metallic structure and being used for the dissolution of oxygen comprising the steps of:
   a. providing a hydrophilic nickel layer;
   b. connecting a first metal structure to said nickel layer by spot welding;
   c. placing a mixture of carbon and a hydrophobic plastic in the recesses in said metal structure;
   d. applying pressure to produce a carbon layer;
   e. exposing the surface of the metal structure facing away from the nickel layer;
   f. enclosing a second metal structure in a hydrophobic plastic such that isolated metallic areas remain free of plastic;
   g. connecting the isolated metallic areas of the said second metal structure to the exposed surface of the first metal structure by spot welding;
   h. applying a hydrophobic plastic to the second metal structure so as to completely embed said second metal structure in a plastic layer that extends up to the carbon layer; and
   i. sintering the structure so formed.

17. The method according to claim 16 and further including the step of adding a catalytically active substance to the carbon.

18. The method according to claim 16 and further including the step of adding a filler to the carbon plastic mixture.

* * * * *